(12) United States Patent
Morrison et al.

(10) Patent No.: US 11,658,583 B2
(45) Date of Patent: *May 23, 2023

(54) CONTROL CIRCUIT FOR A POWER CONVERTER

(71) Applicant: Advanced Energy Industries, Inc., Denver, CO (US)

(72) Inventors: Richard Morrison, Cork (IE); Jonathan James Wilkinson, Cork (IE); Phelim Bradley, Cork (IE)

(73) Assignee: Advanced Energy Industries, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,549

(22) Filed: Nov. 11, 2021

(65) Prior Publication Data

US 2022/0069723 A1    Mar. 3, 2022

Related U.S. Application Data

(63) Continuation of application No. 16/734,236, filed on Jan. 3, 2020, now Pat. No. 11,190,109.

(60) Provisional application No. 62/788,699, filed on Jan. 4, 2019.

(51) Int. Cl.
*H02M 3/335* (2006.01)
*H02M 1/14* (2006.01)
*H02M 1/32* (2007.01)
*H02M 1/00* (2006.01)

(52) U.S. Cl.
CPC ......... *H02M 3/33592* (2013.01); *H02M 1/14* (2013.01); *H02M 1/32* (2013.01); *H02M 1/0045* (2021.05)

(58) Field of Classification Search
CPC ............. H02M 3/335; H02M 3/33569; H02M 3/33526; H02M 3/33592; H02M 1/14; H02M 1/15; H02M 1/32; H02M 1/0045
See application file for complete search history.

(56) References Cited

U.S. PATENT DOCUMENTS

| 4,525,774 A | 6/1985 | Kino et al. |
| 5,272,612 A | 12/1993 | Harada et al. |
| 5,397,976 A | 3/1995 | Madden et al. |
| 5,434,770 A | 7/1995 | Dreifuerst et al. |
| 5,737,203 A | 4/1998 | Barrett |

(Continued)

FOREIGN PATENT DOCUMENTS

WO    2015071842 A1    5/2015

OTHER PUBLICATIONS

Extended European Search Report for EP Application 15193487.4; dated May 20, 2020; 3 pages.

(Continued)

*Primary Examiner* — Adolf D Berhane

(57) ABSTRACT

The invention provides a control circuit for controlling the operation of a power converter having a switch connected to an output of the power converter, said control circuit comprising a first amplifier for sensing an output voltage of the power converter and a second amplifier configured to derive a frequency compensated error signal output, to provide a frequency control compensation loop to an input of the power converter and the output of the second amplifier is connected to the switch of the power converter.

20 Claims, 10 Drawing Sheets

(56) References Cited

U.S. PATENT DOCUMENTS

| | | | |
|---|---|---|---|
| 6,181,120 B1 | 1/2001 | Hawkes et al. | |
| 7,869,237 B1 | 1/2011 | Schutten et al. | |
| 11,190,109 B2* | 11/2021 | Morrison .......... | H02M 3/33561 |
| 2006/0139977 A1 | 6/2006 | Oicles et al. | |
| 2009/0322234 A1 | 12/2009 | Chen et al. | |
| 2010/0097826 A1 | 4/2010 | Xu et al. | |
| 2011/0316430 A1 | 12/2011 | Cohen et al. | |
| 2012/0007512 A1 | 1/2012 | Kim et al. | |
| 2012/0112721 A1 | 5/2012 | Wu et al. | |
| 2013/0201726 A1 | 8/2013 | Hu et al. | |
| 2015/0015071 A1 | 1/2015 | Deboy et al. | |
| 2017/0085168 A1 | 3/2017 | Laur et al. | |

OTHER PUBLICATIONS

Final Office Action for U.S. Appl. No. 15/344,419, dated Oct. 4, 2018; 16 pages.

Kim et al., "LLC Series Resonant Converter With Auxiliary Circuit for Hold-Up Time", Telecommunications energy Conference, 2009, Oct. 18, 2009, Publisher: INTELEC 2009 31st International; 5 pages.

Non-Final Office Action for U.S. Appl. No. 15/344,419, dated Mar. 22, 2018; 13 pages.

Non-Final Office Action for U.S. Appl. No. 15/344,419, dated May 3, 2019; 23 pages.

Non-Final Office Action for U.S. Appl. No. 15/344,419, dated Oct. 23, 2020; 31 pages.

Non-Final Office Action for U.S. Appl. No. 15/344,419, dated Jan. 14, 2020; 17 pages.

Non-Final Office Action for U.S. Appl. No. 15/344,419, dated Jun. 30, 2017; 21 pages.

\* cited by examiner

CONTROL CIRCUIT FOR A POWER CONVERTER

CROSS-REFERENCE TO RELATED APPLICATIONS

This application claims benefit of and priority to U.S. application Ser. No. 16/734,236, filed Jan. 3, 2020, and U.S. Provisional Application No. 62/788,699, filed Jan. 4, 2019. The entire disclosures of the above applications are incorporated herein by reference.

TECHNICAL FIELD

The disclosure relates to control of the output of a power converter.

BACKGROUND

A known power converter topology comprises a single primary switching stage connected to a resonant tank circuit which provides the primary voltage to one or more transformers, all of which have their primary windings connected in parallel. Each transformer secondary is rectified and cascaded with a buck converter to deliver an output voltage. The transformers, secondary rectifiers and buck converters can be offered as individual modules to maximize the configurability of the system. The industry standard solution to the LLC output voltage increasing at light load is to operate the converter in burst mode where it turns off for several switching cycles.

The industry standard solution to maintaining other outputs on overload of an output in a multiple output converter configuration is to use buck converter post-regulators. There are a number of problems associated with using a buck converter post-regulator.

For example, the most common topology for ac/dc power converters delivering over 50 W is the LLC converter. At light load, the output of an LLC converter tends to increase to 150% of the nominal level. Multiple output ac/dc converters are typically realized using LLC converters with a single transformer and multiple secondary windings. An overload or short circuit on any output will cause the other outputs to be turned off.

It is therefore an object to provide an improved power control module or circuit to overcome the problems associated with a buck converter post-regulator in a power converter Overview According to the invention there is provided a control circuit for controlling the operation of a power converter having a switch connected to an output of the power converter, said control circuit comprising:

a first amplifier for sensing an output voltage of the power converter and a second amplifier configured to derive a frequency compensated error signal output, to provide a frequency control compensation loop to an input of the power converter and the output of the second amplifier is connected to the switch of the power converter.

In one embodiment a resistor element is connected between the output of the second amplifier and the switch. An important feature of the invention is the means by which a series FET linear regulator/control switch is controlled with the output of the output voltage error amplifier connected to the gate of the series FET switch through a resistor, thereby achieving control of the series FET by means of a single resistor.

It will be appreciated that the resistor is not strictly necessary such that the resistor be replaced by a connection in certain applications, i.e. control of the series switch is achieved with no extra components. This can be especially useful in very simple power converter architectures.

In one embodiment the switch is a MOSFET switch series-connected with the output of an isolated ac/dc converter.

The invention overcomes the aforementioned problems by utilizing a simpler post-regulation stage scheme than a buck converter. The switch acts as a linear regulator at light load and as a fully turned on switch at heavy load.

In one embodiment the control circuit comprises a current limit protection module configured to differentially amplify a voltage across a current sense resistor, Vcs using a third amplifier, and then subtracting the signal from a reference and integrating and frequency compensating the resultant error signal using a fourth amplifier.

In one embodiment there is provided a short circuit protection switch connected to the resistor element and configured to receive control signals from a digital controller.

In one embodiment the digital controller, such as a microcontroller, configured to supervise the secondary controller and communicate externally to enable the output voltage and current limit references to be varied The microcontroller allows the output voltage to be adjusted, the output voltage to be turned off, control of the primary LLC switching frequency by the secondary to be disabled (at light load or with the output turned off) and output short circuit and overvoltage protection to be implemented.

In one embodiment the microcontroller comprises a PWM (Pulse Width Modulation) module driven by a digital supervision scheme configured with finer resolution of the output voltage adjustment by the addition of a filtered PWM signal with an ADC output signal.

In one embodiment a primary side microcontroller could be interfaced with the secondary side controller.

It will be appreciated that the series FET switch of the invention acts as a linear regulator at light load thereby keeping the output voltage at its nominal level. If the series FET post regulator is applied to any output, then that output can be overloaded without turning off the other outputs.

In another embodiment there is provided a method for controlling the operation of a power converter having a switch connected to an output of the power converter, the method comprising the steps of:

configuring a first amplifier to sense an output voltage of the power converter; and configuring a second amplifier to derive a frequency compensated error signal output, $V_{fn}$, to provide a frequency control compensation loop to an input of the power converter and an output, $V_g$, of the second amplifier is connected to the switch of the power converter.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION

Figure 1:
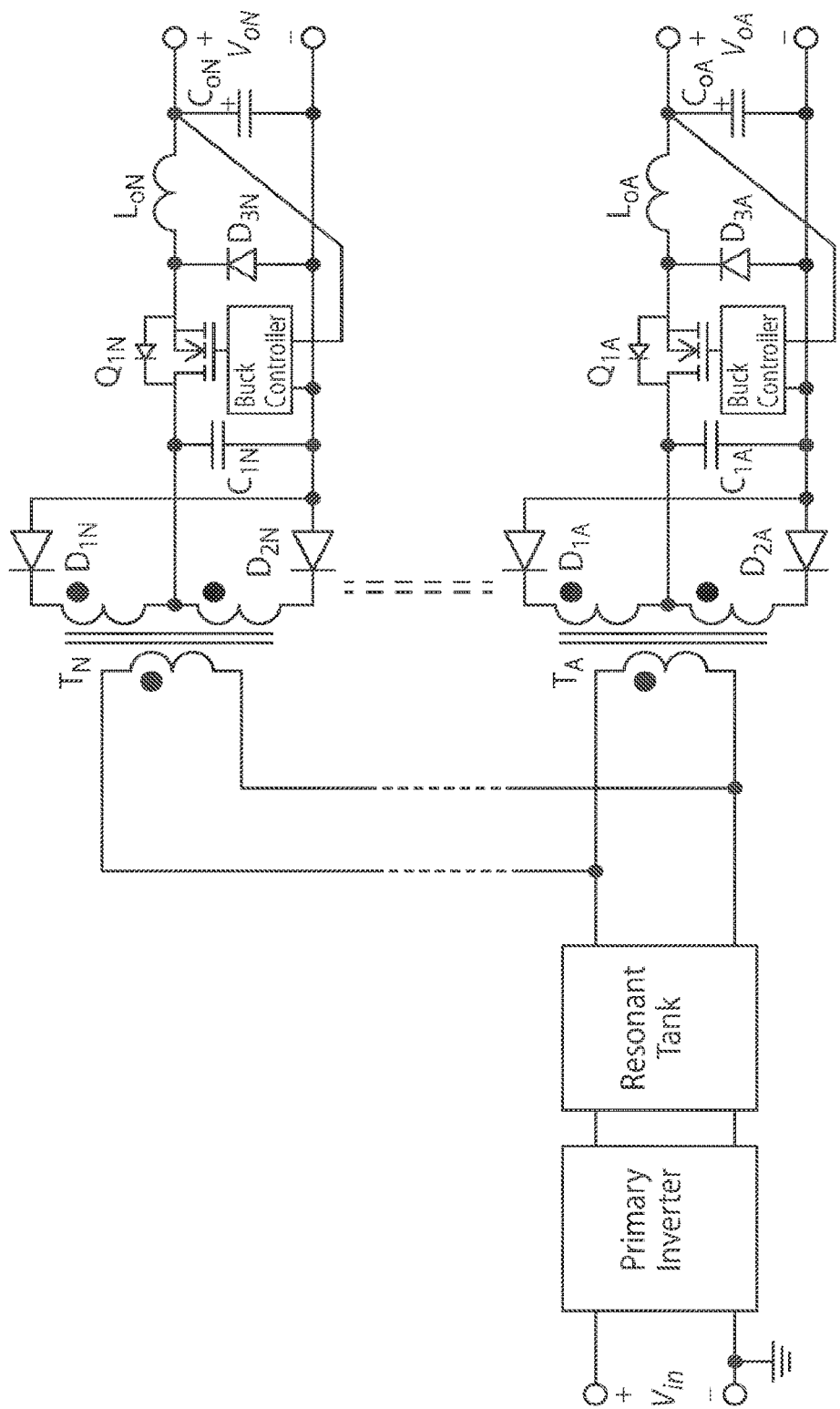
FIG. 1 illustrates a resonant dc/dc converter with multiple transformers providing multiple isolated buck post-regulated outputs.

FIG. 1 shows an isolated dc/dc converter topology comprising a single primary switching stage connected to a resonant tank circuit which provides the primary voltage to several transformers, $T_A \ldots T_N$, all of which have their primary windings connected in parallel. Each transformer secondary is rectified and cascaded with a buck converter to deliver an output voltage. The transformers, secondary rectifiers and buck converters can be embodied as individual modules to maximize the configurability of the system. The resonant dc/dc secondary rectifiers $D_{1A\_N}$ and $D_{2A\_N}$ can represent diodes or MOSFET synchronous rectifiers. The inclusion of a buck converter post-regulation facilitates a wide output voltage adjustment range, individual output enable/disable and independent output protection but compromises power density, cost, complexity, efficiency and radiated electromagnetic interference.

Figure 2:
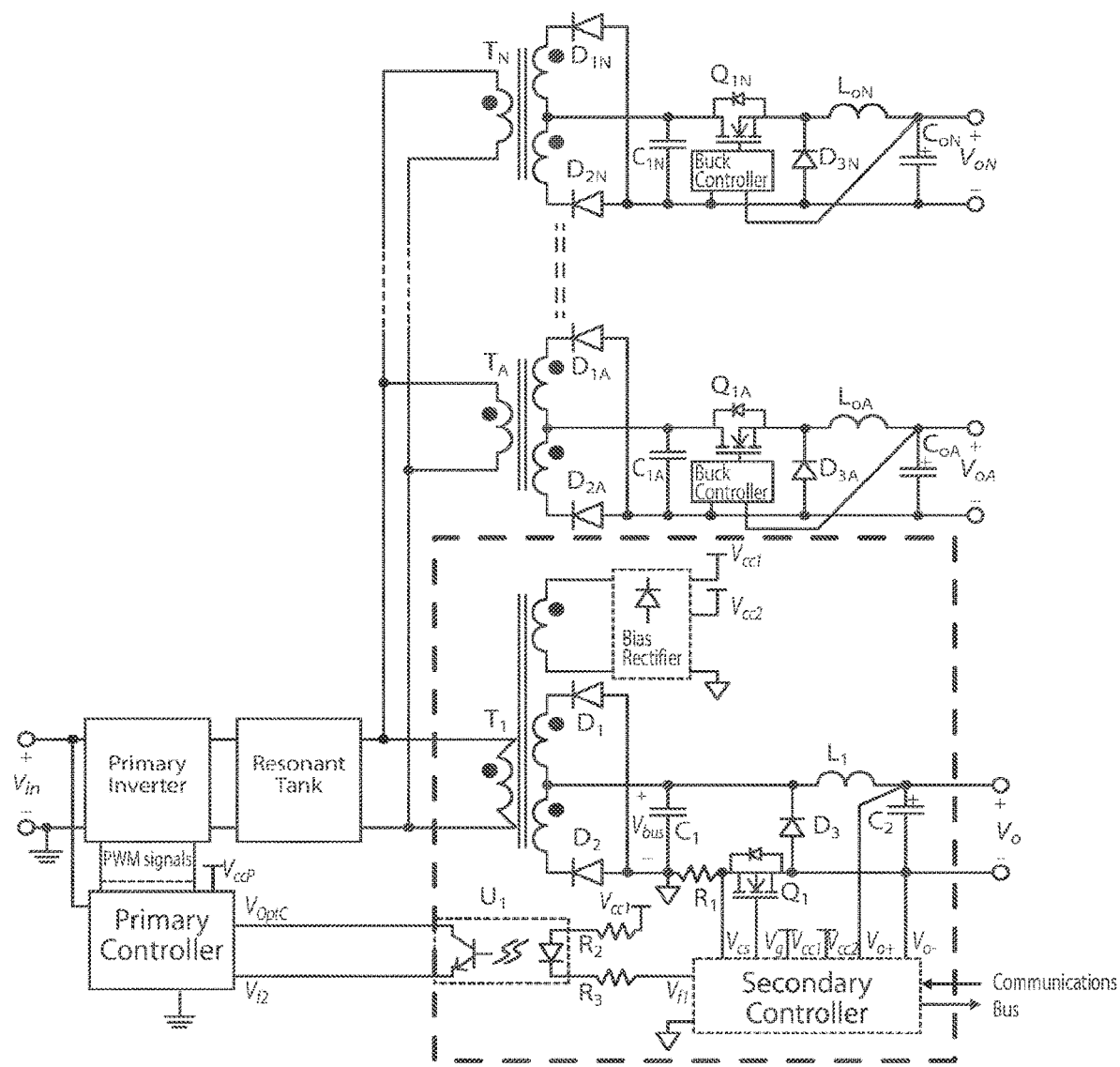
FIG. 2 illustrates an alternative post regulation with MOSFET connected in series with the output return path.

FIG. 2 shows a circuit design to provide a 'bulk power' range of output modules designed by replacing the buck post-regulation stage, shown in FIG. 1, with a MOSFET, $Q_1$ connected in series with the output return. $Q_1$ is not subjected to Pulse Width Modulation (PWM), instead it is either fully off with the output disabled, fully on with the output delivering heavy load current (>5% of rated load current) or linearly regulating with the output delivering light load current. The output filter inductor $L_1$ limits the ripple current through the output capacitor $C_2$ which typically has an electrolytic dielectric. $L_1$ also serves to limit the rate of rise in the current through $Q_1$ on application of output short circuit. 'Catch' diode, $D_3$ circulates the current of the output filter inductor, $L_1$ on turn-off of $Q_1$ which would otherwise be subjected to avalanche breakdown. The connection of $Q_1$ in the return path allows the gate drive circuit for $Q_1$ can be referenced to the same return as that of the synchronous rectifiers $D_{1,2}$. $R_1$, which is connected between the source of $Q_1$ and ground acts as a current sense resistor.

Figure 3:
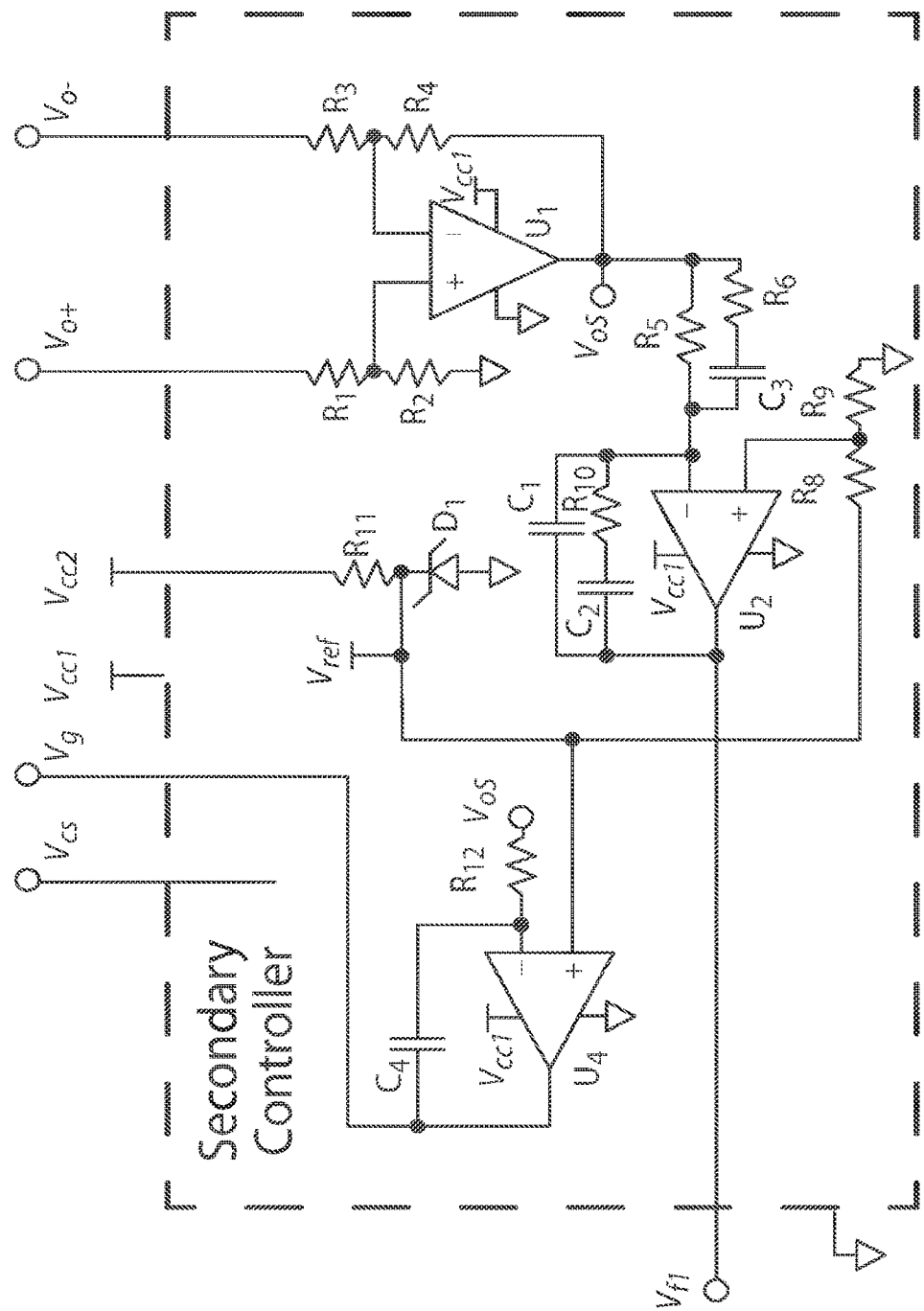
FIG. 3 illustrates a separate resonant converter frequency and series connected MOSFET gate voltage controllers.

A principal objective of the secondary controller of FIG. 2 is to set the current in the feedback optocoupler $U_1$ to a level proportional to the required primary inverter switching frequency so as to maintain the output voltage, Vo at the reference level. This is achieved by sensing Vo using opamp $U_1$, configured differentially as shown in FIG. 3 and deriving a frequency compensated error signal using opamp $U_2$ which is configured as an integrator where the reference level is derived from the Zener diode $D_1$. One of the main challenges of controlling resonant converters is that at light load current (<1% of rated output), the output increases by over 50% relative to that at heavy loads (>5% of rated output). This can be addressed by running the inverter in burst mode if the deterioration in load step response and increased audible noise is acceptable. In this topology, the series connected MOSFET can be used to keep the output voltage down at light load by operating it as a linear regulator as shown in FIG. 3 where $V_g$ is connected to the output of an integrator/error amplifier configured opamp $U_4$. $V_g$ is clamped to the upper rail of $U_4$ for heavy loads where the output is under the direct control of $V_{f1}$ because while both compensation opamps have the sensed output voltage, Vos connected to their negative inputs, the positive input to $U_4$ is set up to be slightly higher than that of $U_2$. Thus for heavy loads, the series connected MOSFET is turned fully on assuming $V_{cc1}$ is greater than the gate source threshold voltage of the series connected MOSFET. At light loads, where the frequency cannot keep Vo at the reference level and the output of $U_2$ is clamped to the lower rail, $U_4$ acts to decrease $V_g$ to the level where the voltage difference between the reference output voltage and the rectified output of the resonant converter, $V_{bus}$ in FIG. 2, is dropped across $Q_1$ of FIG. 2.

Figure 4:
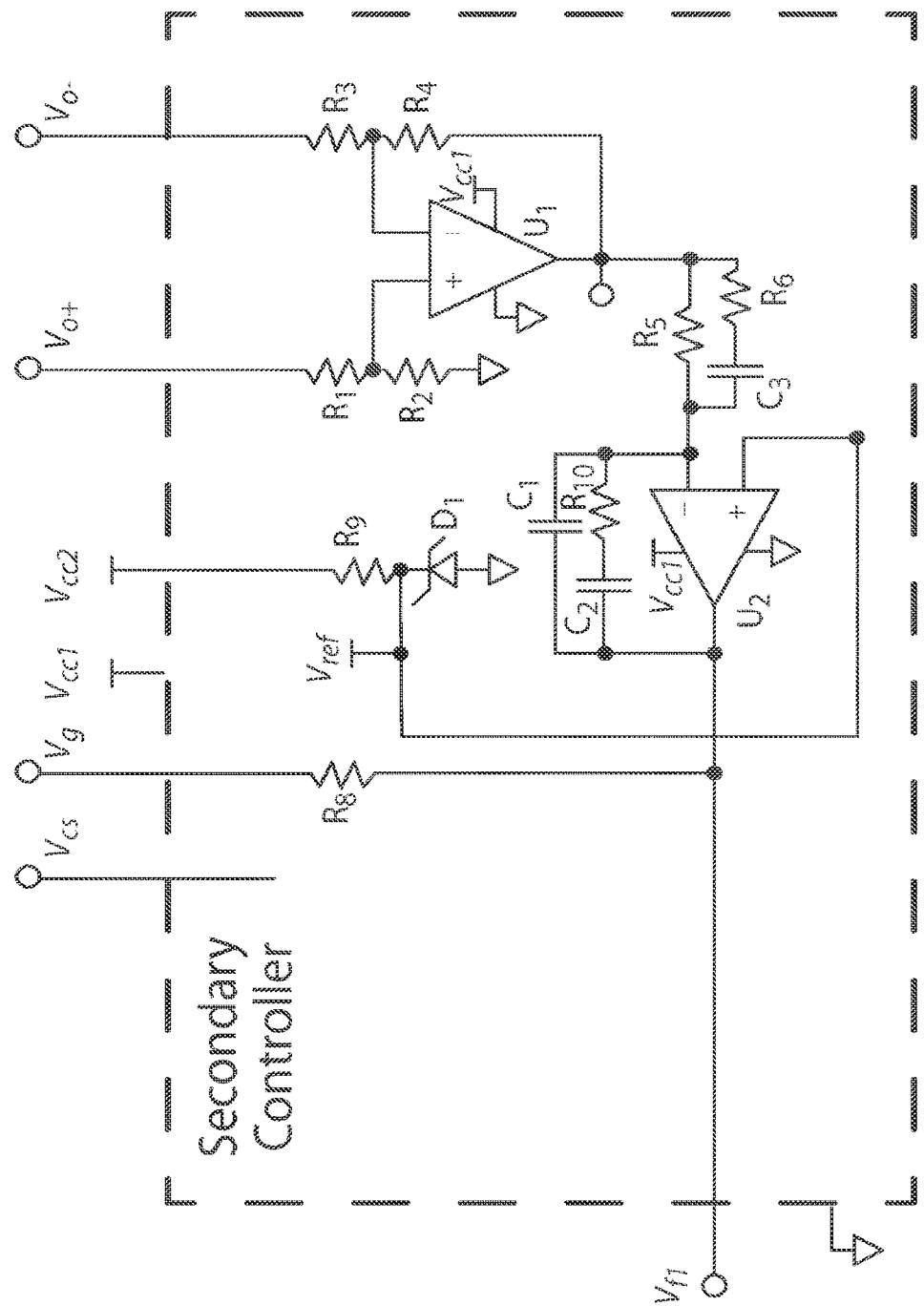
FIG. 4 illustrates an integration of resonant converter frequency and series connected MOSFET gate voltage controller, according to one embodiment.

FIG. 4 shows a control circuit according to a first aspect of the invention for controlling the series connected MOSFET switch $Q_1$ using only two op-amps compared to the embodiment of FIG. 3. By tying the output of the frequency control loop opamp $U_2$ to $V_g$, automatic transfer of control between the frequency control loop and the linear regulation one is achieved. The optocoupler series resistance and the bias level $V_{cc1}$ should be selected so that for heavy loads, $V_{f1}$ must be greater than the gate source threshold voltage of the series connected MOSFET.

Figure 5:
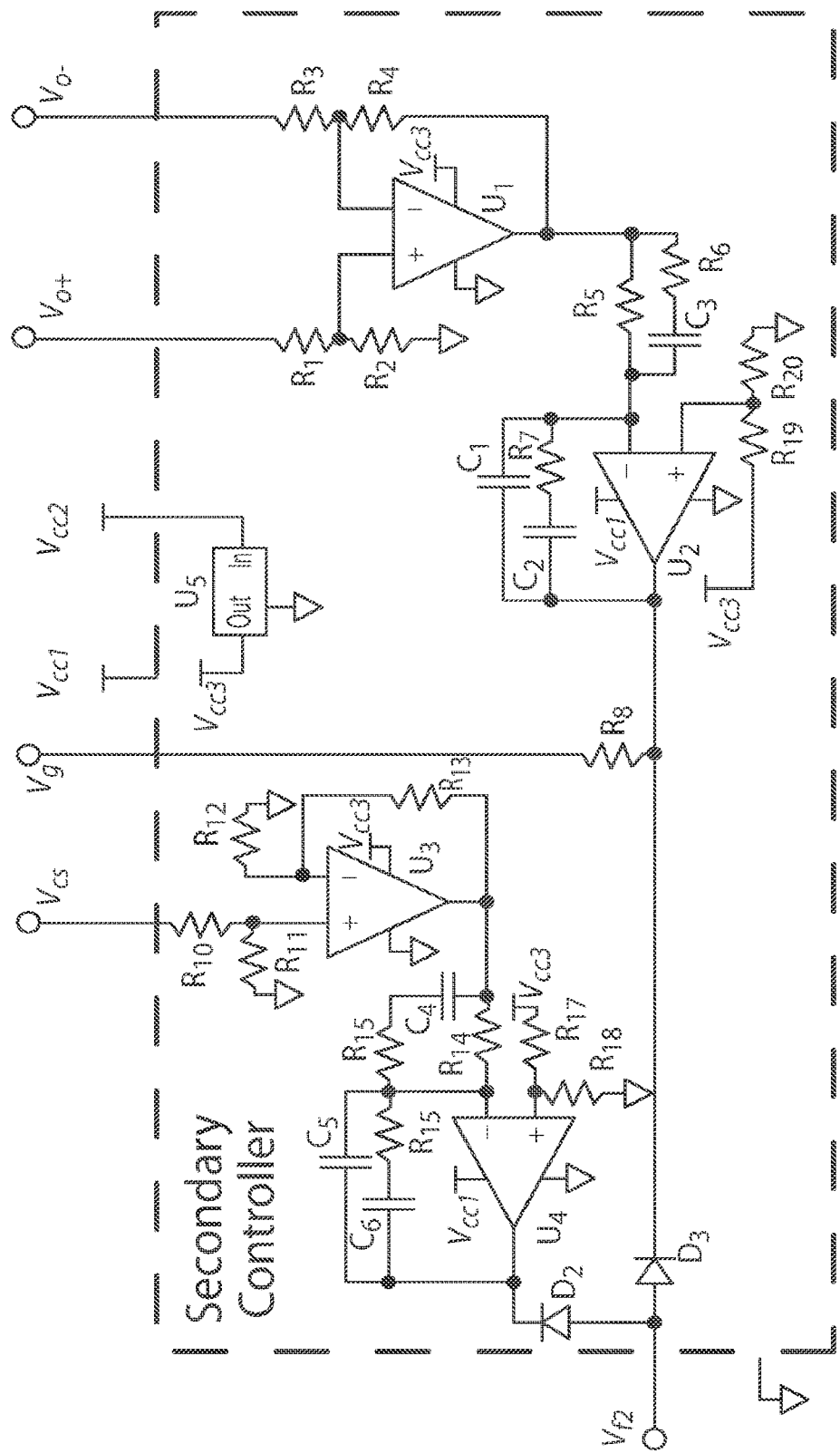
FIG. 5 illustrates a secondary controller incorporating output current limit circuit.

Current limit protection can be added as shown in FIG. 5 by differentially amplifying the voltage across the current sense resistor, Vcs using $U_3$, and then subtracting it from a reference and integrating and frequency compensating the resultant error signal using $U_4$. The transfer of control between the current and voltage loops is realized by the diodes $D_2$ and $D_3$ connected in series with each opamp output ensuring that whichever loop is demanding the highest frequency dictates $V_{f1}$. Here the fixed reference for the control loops, $V_{cc3}$ is shown as derived directly from the linear regulator $U_5$. In current limit mode, the voltage control opamp $U_2$ is clamped to its upper rail ensuring the series connected MOSFET is turned fully on.

Figure 6:
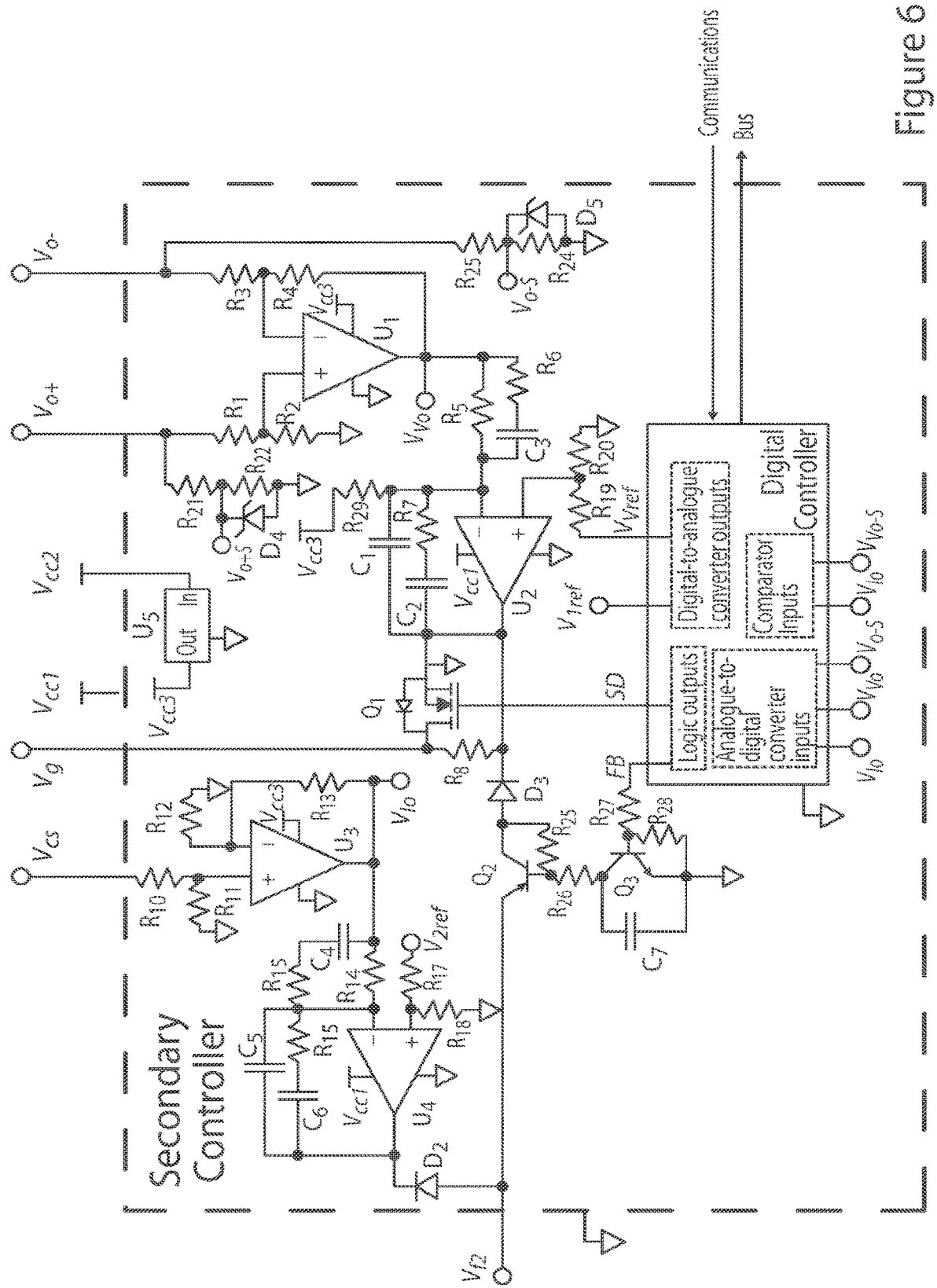
FIG. 6 illustrates a secondary controller incorporating digital supervision, according to one embodiment.

The addition of a digital circuit, such as a microcontroller, to supervise the secondary controller and communicate externally allows the output voltage and current limit references to be varied is shown in FIG. 6 where they are generated by digital-to-analogue converters (ADC). Short circuit protection is implemented by comparing the positive output terminal voltage to a threshold to avoid any delay due to opamp slew rates and directly turning off the gate of the series connected MOSFET using logic output 'SD' which turns on MOSFET $Q_1$ bringing $V_g$ to ground. At light load, the output of $U_2$ drops towards the gate threshold voltage of the series-connected MOSFET as it transitions to linear regulating mode. If the output of $U_2$ is kept connected to $V_{f1}$, the resonant converter frequency is increased to its maximum level which limits the power throughput of the primary resonant tank thereby limiting the power which can be drawn from other outputs. This is avoided by monitoring the load current sense signal, $V_{lo}$ using an analogue-to-digital converter. If it drops below a threshold equivalent to light load, an optocoupler feedback is disconnected by toggling the logic output signal, 'FB' to zero. This turns off the npn $Q_3$ off thereby turning the pnp $Q_2$ off effectively disconnecting the output of $U_2$ from $V_{f1}$. The primary controller is designed to respond to the cutoff of the feedback optocoupler current by taking over control of the primary switching frequency. The series-connected MOSFET has sufficient power dissipation capability to drop the difference between the $V_{bus}$ and $V_o$ at load currents below the load current threshold for secondary frequency control. The negative output terminal voltage is monitored by potential divider, $V_{o-S}$ which, in combination with the load current, $V_{lo}$ allows the series-connected MOSFET to be turned off in the event that it is subjected to excessive dissipation.

Figure 7:
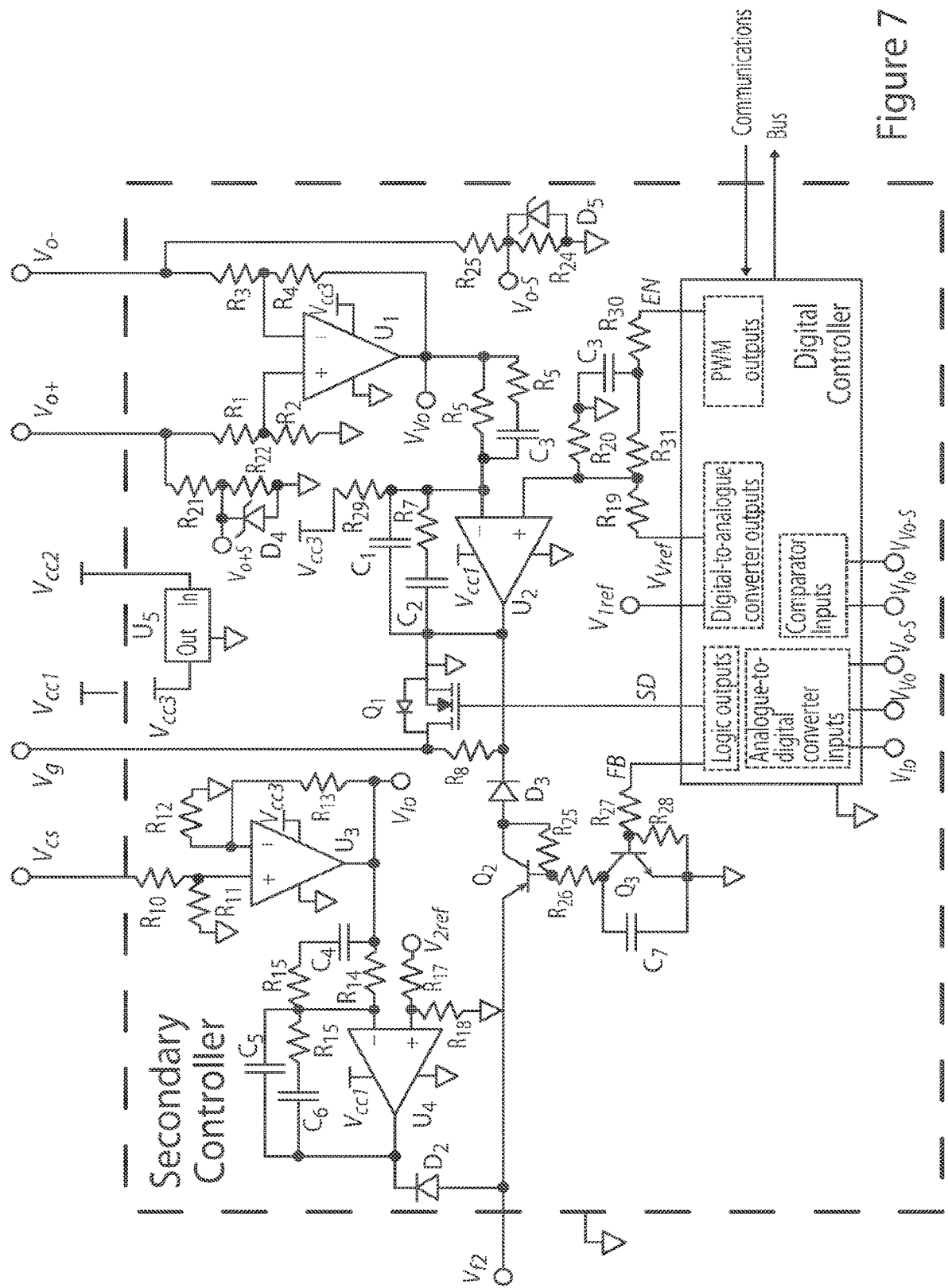
FIG. 7 illustrates a digitally supervised secondary controller with fine and coarse resolution output voltage references, according to one embodiment.

FIG. 7, similar to FIG. 6, shows a digital supervision scheme with a finer resolution of the output voltage adjustment achieved by the addition of a filtered PWM signal with an ADC output signal.

Figure 8:
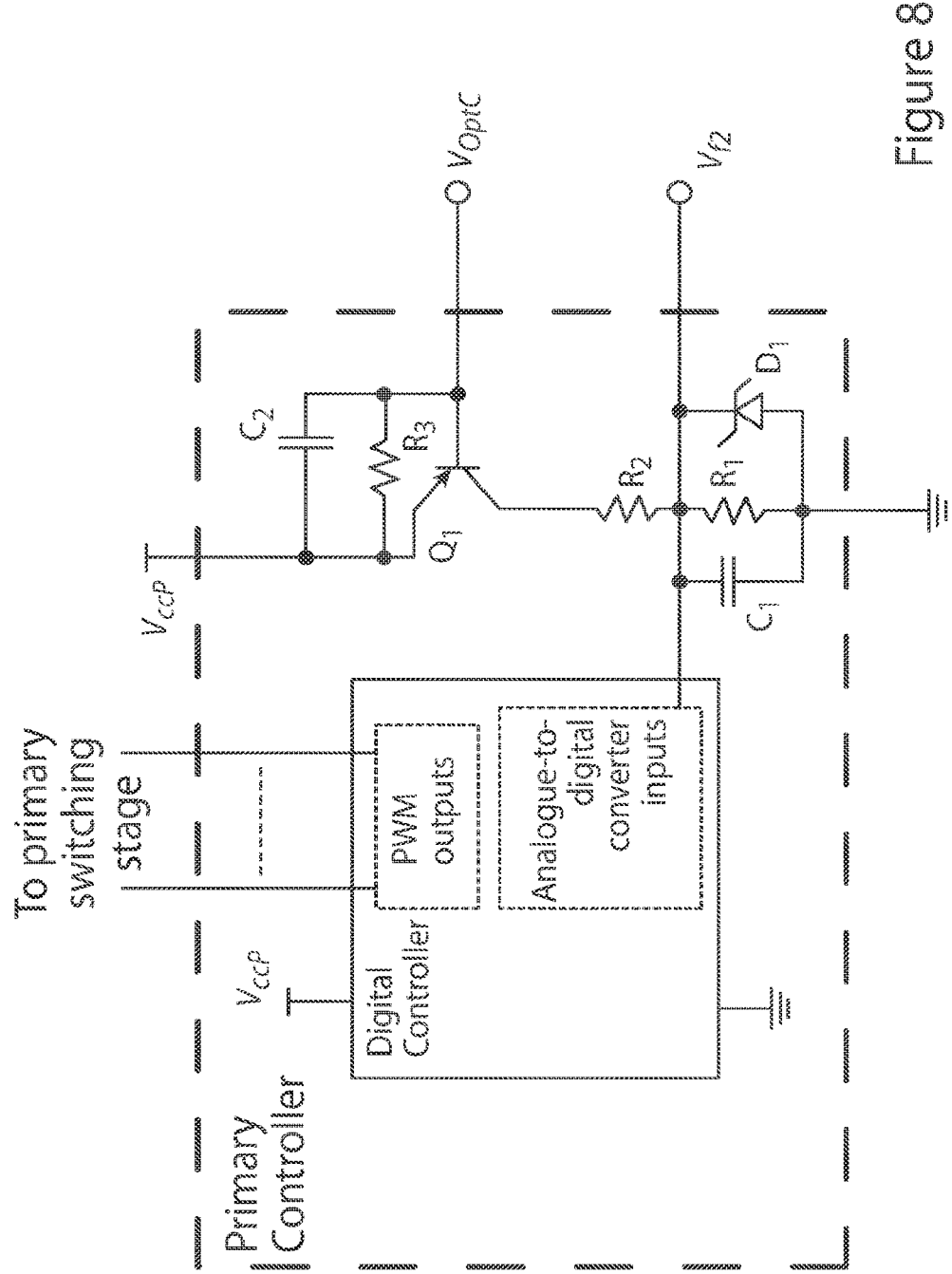
FIG. 8 illustrates a primary controller with automatic feedback pull-up on secondary feedback optocoupler enable, according to one embodiment.

FIG. 8 shows how the primary digital controller can interface with a feedback optocoupler. The primary optocoupler emitter voltage is input to an ADC which dictates the primary inverter switching frequency. The pnp transistor $Q_1$ is turned on when the optocoupler collector passes current. The base resistor $R_3$ is selected so that when 'FB' of FIG. 6 is high to enable optocoupler feedback, the current which passes through the feedback optocoupler diode, into the emitter of $Q_2$ and out its base is sufficient to turn on $Q_1$ of FIG. 6. Thus, even with $U_2$ of FIG. 6 clamped to its upper rail, $Q_1$ of FIG. 6 is turned on with 'FB' at high logic level thereby raising $V_{f2}$ of FIG. 6 to a level that can be detected by the primary controller as an indication that control of the primary switching frequency is to be dictated by $V_{f2}$.

Figure 9:
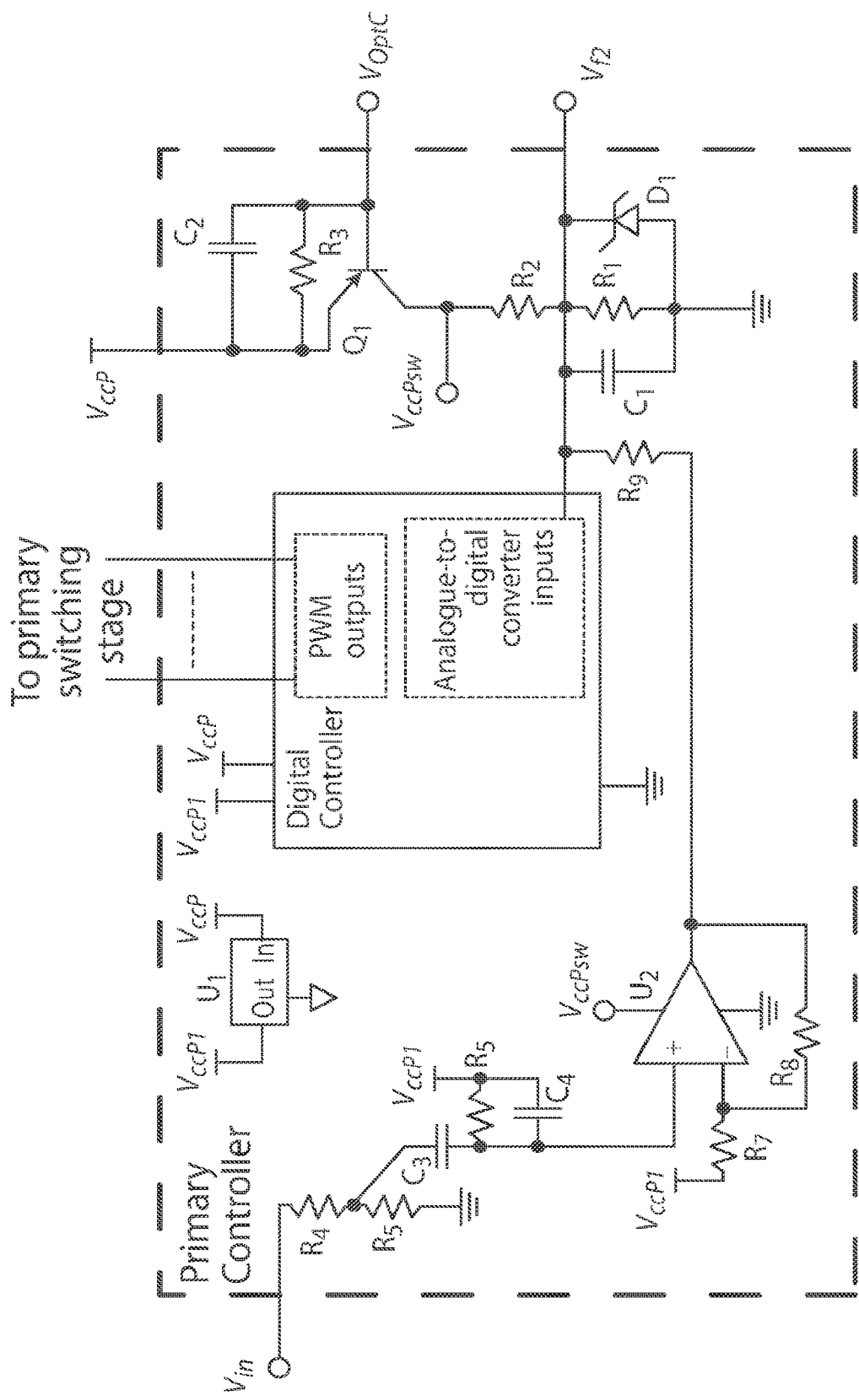
FIG. 9 illustrates a primary controller incorporating automatic feedback pull-up and input voltage ripple feedforward, according to one embodiment.
Figure 10:
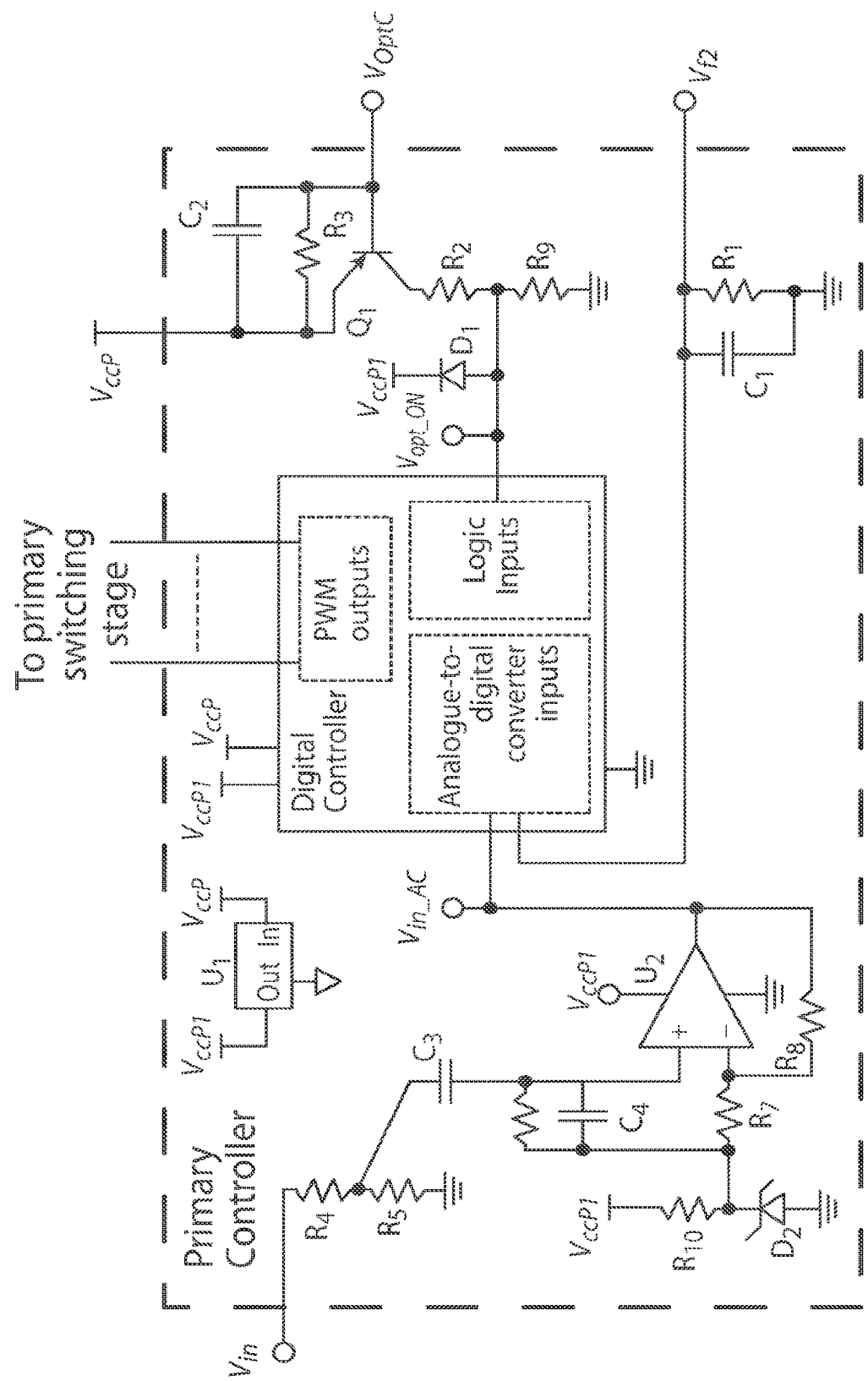
FIG. 10 illustrates a primary controller incorporating automatic feedback pull-up and input voltage ripple feedforward, according to another embodiment.

Feedforward of changes to the inverter input voltage, Vin can be implemented as shown in FIG. 9 or FIG. 10. Vin is typically generated by a power factor correction stage in which case it has significant ripple at twice the line frequency. The ac coupled amplifier based on opamp $U_2$ is designed to transfer frequencies in this range to its output so as to impose changes on $V_{f2}$ which correct for the changes in Vin. This can be done either by resistor summation as in FIG. 9 or in code in the microcontroller as in FIG. 10 where the input voltage ripple and the optocoupled feedback are separately monitored by ADC's. The primary controller microcontroller is configured to control a primary switching frequency that can be disabled by delivering a logic signal derived from a transistor switch connected in series with the collector of a feedback optocoupler. The primary side microcontroller is connected to an operational amplifier $U_2$ where the output of the operational amplifier is connected to an Analogue-to Digital Converter of the primary side microcontroller and configured to sense a variation in an input voltage for monitoring feedforward compensation in the primary side microcontroller.

For the analogue feedforward approach of FIG. 9, $U_2$ is biased from the collector of $Q_1$ to minimize the offset imposed on $V_{f2}$ when the feedback optocoupler is disabled.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. A control circuit for controlling the operation of a power converter having a switch connected to an output of the power converter, the control circuit comprising:
    a first amplifier configured to sense an output voltage of the power converter; and
    a second amplifier configured to derive a frequency compensated error signal output, $V_{f1}$, to provide a frequency control compensation loop to an input of the power converter and an output, $V_g$, of the second amplifier is connected to the switch of the power converter;
wherein the switch is a MOSFET switch and connected in series with the output of an isolated ac/dc converter.

2. The control circuit of claim 1 further comprising a resistor element coupled between the output of the second amplifier and the switch.

3. The control circuit of claim 1 further comprising a current limit protection module configured to differentially amplify a voltage across a current sense resistor, $V_{cs}$, using a third amplifier.

4. The control circuit of claim 3, wherein the current limit protection module is configured to subtract the signal from a reference and integrate and frequency compensate the resultant error signal using a fourth amplifier.

5. The control circuit of claim 1 further comprising a short circuit protection switch connected to a resistor element and configured to receive control signals from a digital controller.

6. The control circuit of claim 1 further comprising a microcontroller configured to communicate and enable the output voltage and current limit references to be varied.

7. The control circuit of claim 6, wherein the microcontroller is programmed to enable one or more of the following features: allows the output voltage to be adjusted; the output voltage to be turned off; control of the primary LLC switching frequency by the secondary to be disabled at light load or with the output turned off; and/or output short circuit and overvoltage protection.

8. The control circuit of claim 1, wherein a microcontroller comprises a PWM module driven by a digital supervision scheme and configured with a finer resolution of the output voltage adjustment by the addition of a filtered PWM signal with an ADC output signal.

9. The control circuit of claim 1 further comprising a resistor $R_1$, connected between a source of the switch and ground, the resistor is configured to act as a current sense resistor.

10. The control circuit of claim 1, wherein an output filter inductor $L_1$ connected to the switch is configured to limit ripple current through an output capacitor $C_2$ and limits the rate of rise in the current.

11. The control circuit of claim 10, wherein a diode circulates current from the output filter inductor, $L_1$ on turn-off of the switch to prevent avalanche breakdown.

12. The control circuit of claim 1, wherein a primary side microcontroller is interfaced with the control circuit.

13. The control circuit of claim 12, wherein the primary controller microcontroller is configured to control a primary switching frequency that can be disabled by delivering a logic signal derived from a transistor switch connected in series with the collector of a feedback optocoupler.

14. The control circuit of claim 12, wherein the primary side microcontroller is connected to an operational amplifier where the output of the operational amplifier is connected to an Analogue-to Digital Converter of the primary side microcontroller and configured to sense a variation in an input voltage for monitoring feedforward compensation in the primary side microcontroller.

15. The control circuit of claim 1, wherein a series FET linear regulator/control switch is controlled with the output of the output voltage error amplifier connected to the gate of the series FET linear regulator/control switch through a resistor.

16. A control circuit for controlling the operation of a power converter having a switch connected to an output of the power converter, the control circuit comprising:
 a first amplifier configured to sense an output voltage of the power converter;
 a second amplifier configured to derive a frequency compensated error signal output, $V_{f1}$, to provide a frequency control compensation loop to an input of the power converter and an output, $V_g$, of the second amplifier is connected to the switch of the power converter; and
 a current limit protection module configured to differentially amplify a voltage across a current sense resistor, $V_{cs}$, using a third amplifier.

17. The control circuit of claim 16, wherein the current limit protection module is configured to subtract the signal from a reference and integrate and frequency compensate the resultant error signal using a fourth amplifier.

18. The control circuit of claim 16, wherein the switch is a MOSFET switch and connected in series with the output of an isolated ac/dc converter.

19. A control circuit for controlling the operation of a power converter having a switch connected to an output of the power converter, the control circuit comprising:
 a first amplifier configured to sense an output voltage of the power converter;
 a second amplifier configured to derive a frequency compensated error signal output, $V_{f1}$, to provide a frequency control compensation loop to an input of the power converter and an output, $V_g$, of the second amplifier is connected to the switch of the power converter; and
 a microcontroller configured to communicate and enable the output voltage and current limit references to be varied.

20. The control circuit of claim 19, wherein the microcontroller is programmed to enable one or more of the following features: allows the output voltage to be adjusted; the output voltage to be turned off; control of the primary LLC switching frequency by the secondary to be disabled at light load or with the output turned off; and/or output short circuit and overvoltage protection.

* * * * *